United States Patent
Song et al.

(10) Patent No.: US 8,533,469 B2
(45) Date of Patent: Sep. 10, 2013

(54) METHOD AND APPARATUS FOR SHARING DOCUMENTS

(75) Inventors: Zhexuan Song, Silver Spring, MD (US); Ryusuke Masuoka, Potomac, MD (US); Jesus Molina, San Francisco, CA (US)

(73) Assignee: Fujitsu Limited, Kawasaki-shi (JP)

(*) Notice: Subject to any disclaimer, the term of this patent is extended or adjusted under 35 U.S.C. 154(b) by 711 days.

(21) Appl. No.: 12/623,861

(22) Filed: Nov. 23, 2009

(65) Prior Publication Data

US 2011/0126008 A1 May 26, 2011

(51) Int. Cl.
*H04L 29/00* (2006.01)

(52) U.S. Cl.
USPC ............ 713/167; 713/164; 709/225; 709/226

(58) Field of Classification Search
USPC .......................................... 713/164
See application file for complete search history.

(56) References Cited

U.S. PATENT DOCUMENTS

| | | | | |
|---|---|---|---|---|
| 6,314,425 | B1* | 11/2001 | Serbinis et al. | 1/1 |
| 6,978,366 | B1* | 12/2005 | Ignatchenko et al. | 713/166 |
| 2003/0056095 | A1* | 3/2003 | Elliott et al. | 713/164 |
| 2008/0002830 | A1* | 1/2008 | Cherkasov et al. | 380/277 |

FOREIGN PATENT DOCUMENTS

WO   WO 2008/042846   4/2008

OTHER PUBLICATIONS

International Search Report and Written Opinion; PCT/US2010/055194; pp. 11, Jan. 7, 2011.

* cited by examiner

*Primary Examiner* — Phillip J. Chea
*Assistant Examiner* — Ghazal Shehni
(74) *Attorney, Agent, or Firm* — Baker Botts L.L.P.

(57) ABSTRACT

A method for securely sharing electronic documents on a document storage system. The method includes receiving an electronic document from a creating user, generating an encryption key unique to the electronic document, encrypting the electronic document using the encryption key to create an encrypted electronic document, and communicating the encrypted electronic document to a document repository for storage/ The method also includes identifying a resource locator for uniquely identifying the storage location of the encrypted electronic document and communicating the encryption key and the resource locator to the creating user. The method also includes receiving the encryption key and the resource locator from a requesting user, retrieving the encrypted electronic document from the document repository using the resource locator, decrypting the encrypted electronic document using the encryption key, and communicating the decrypted electronic document to the requesting user.

16 Claims, 2 Drawing Sheets

METHOD AND APPARATUS FOR SHARING DOCUMENTS

TECHNICAL FIELD

This disclosure relates in general to communication systems and more particularly to a method and apparatus for sharing electronic documents within a communication system.

BACKGROUND

When sharing electronic documents in a networked environment, whether the unsecured Internet or a private intranet, it may be desirable to allow a document creator to share the document with only a select group of other users or devices. Such security may be particularly desirable when the electronic document contains private or sensitive information. Several methods exist to verify the identity of a user attempting to gain access to a share electronic document, such as username and password combinations, and public/private key combinations.

With this variety of security methods, it is often cumbersome for the creator or manager of an electronic document to maintain security credentials and/or communicate the necessary credentials to those users that require access to the electronic document. Further, certain users, such as system administrators, may have access to all documents stored in a centralized document repository. Such depositories are often used in sharing electronic documents, and the access required by certain users to maintain the technical environment may also be used to inappropriately access the documents stored within that environment.

As more and more electronic documents are stored remotely and access to that data through various services becomes increasingly important, it will become correspondingly important to protect the content of those documents and allow access only to those that the author desires to grant access.

SUMMARY OF THE DISCLOSURE

The present disclosure provides a method and apparatus for securely sharing document that substantially eliminates or reduces at least some of the disadvantages and problems associated with previous methods and systems.

According to one embodiment, a method for securely sharing electronic documents on a document storage system may include receiving an electronic document from a creating user, generating an encryption key unique to the electronic document, encrypting the electronic document using the encryption key to create an encrypted electronic document, and communicating the encrypted electronic document to a document repository for storage. The method may also include identifying a resource locator, the resource locator configured to uniquely identify the storage location of the encrypted electronic document and communicating the encryption key and the resource locator to the creating user. The method may also include receiving the encryption key and the resource locator from a requesting user, retrieving the encrypted electronic document from the document repository using the resource locator, decrypting the encrypted electronic document using the encryption key, and communicating the decrypted electronic document to the requesting user.

Also provided is a document storage system for securely sharing electronic documents, comprising an accountability vault. The accountability vault may be configured to receive an electronic document from a creating user, generate an encryption key unique to the electronic document, encrypt the electronic document using the encryption key to create an encrypted electronic document, communicate the encrypted electronic document to a document repository for storage. The accountability vault may also be configured to identify a resource locator and communicate the encryption key and the resource locator to the creating user. The accountability vault may also be configured to receive the encryption key and the resource locator from a requesting user, retrieve the encrypted electronic document from the document repository using the resource locator, decrypt the encrypted electronic document using the encryption key, and communicate the decrypted electronic document to the requesting user.

Technical advantages of certain embodiments of the present disclosure include providing secure means of sharing document among multiple users in a network environment. More particularly, this approach allows the contents of documents shared within a document storage system to be protected from view by administrators and other users with high-level access to document storage system. Further, the creating user is given increased flexibility and control in determining which other users may be granted access to the contents of an electronic document. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
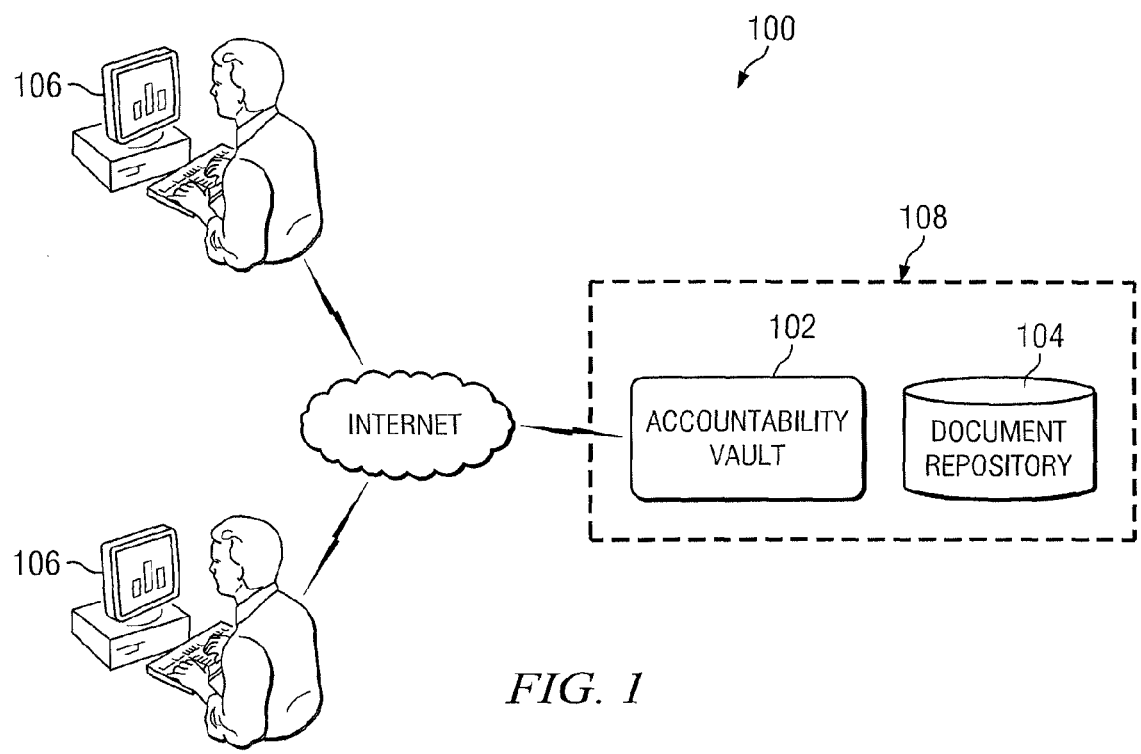
FIG. 1 is a simplified block diagram of an electronic document sharing system, in accordance with certain embodiments of the present disclosure.

FIG. 1 is a simplified block diagram of an electronic document sharing system 100, in accordance with certain embodiments of the present disclosure. According to the illustrated embodiment, electronic document sharing system 100 includes a plurality of users 106 in communication with document storage system 108 and in communication with other users 106. Document storage system 108 includes, in some embodiments, accountability vault 102 and document repository 104.

For purposes of this disclosure, an "electronic document" or "document" may be any file, files, object code, executable code, data records, or any other electronically recorded data structure that user 106 of electronic document sharing system 100 may wish to store and/or share with other users 106 of electronic document sharing system 100. Illustrative examples may include text files, spreadsheets, email, medical records, images, and other electronic data. Additionally, user 106 of electronic document sharing system 100 may refer to a person acting as an end user or to the device or devices used by such a person to access electronic document sharing system 100, such as a personal computer, kiosk, or mobile computing device.

In general, the components of electronic document sharing system 100 may securely store an electronic document edited by a user 106 such that the user 106 and other authorized users 106 may later access that electronic document in a manner that provides the appropriate encryption key only to authorized users and does not store the encryption key within document storage system 108. User 106 may create a document and communicate that document to document storage system 108 via any appropriate network, such as the internet or a private intranet. Accountability vault 102 of document storage system 108 may then encrypt the electronic document using an appropriate encryption scheme, as described in more detail below with reference to FIG. 2. Once encrypted, the electronic document may then be stored in document repository 104. Document repository 104 may be any appropriate database and/or database management system suitable for use in a networked document sharing system, such as Oracle Database or IBM's DB2.

Accountability vault 102 may also communicate the encryption key for the electronic document to the user that created the document ("creating user"), as well as a resource locator. The creating user may be the user 106 that actually created the electronic document or a user 106 that has edited the document or otherwise gained access to the document and now desires to store the document on document storage system 108.

The resource locator may be a reference associated with the electronic document that would allow user 106 to locate or request access to the electronic document. In some embodiments, document storage system 108 may be web-enabled, with each electronic document stored in document repository 104 assigned a unique uniform resource locator ("URL"). Entering this URL into a standard web browser may allow user 106 to request access to the specific electronic document. In some embodiments, the encryption key and the resource locator are communicated to user 106 in a text format. Communication in this manner may allow user 106 to share this information with other users 106 in a convenient manner. Communication of the key and the resource locator between document storage system 108 and user 106, or between user 106 and another user 106 may be in any appropriate format, such as email or SMS.

In some configurations, it may be most efficient to combine the resource locator and encryption key into a single line of communication. In other configurations, it may be deemed to be more secure to separate the resource locator and encryption key into separate communications. In those configurations favoring utmost efficiency, a single communication such as a single URL may be preferable. For instance, the URL communicated to user 106 may take the form of location+resource locator+encryption key. In a web-enabled environment such as that described above, this may take the illustrative form of:

http://web_host/retrieve_document?
        doc_id=1234&key=19da301afe0231823

In this illustrative example, "web_host" may be the network location of database storage system 108, "retrieve_document" may be the name of a process executable on database storage system 108 used to retrieve the desired electronic document, "doc_id" may be the resource locator unique to the desired electronic document, "1234" may be the value of the resource locator, "key" may be the identification of the encryption key used by the "retrieve_document" process, and "19da301afe0231823" may be the value of the encryption key unique to the desired electronic document. This example has been offered solely to facilitate understanding of FIG. 1, and in no way should be interpreted to limit the teaching of this disclosure.

In other embodiments, user 106 may be able to identify other users 106 who should receive the resource locator and encryption key when user 106 stores an electronic document on document storage system 108. Once informed, accountability vault 102 may, in some embodiments, communicate the resource locator and encryption key directly to other users 106 whom user 106 has previously identified. This communication may take the same form as the communication to user 106 described above.

User 106 in possession of the resource locator and encryption key may, at an appropriate time, communicate with document storage system 108 in an attempt to retrieve the electronic document associated with that resource locator and encryption key. In some embodiments, accountability vault 102 may receive the resource locator and encryption key from user 106, retrieve the identified document from document repository 104, and decrypt the document using the encryption key. Once decrypted, accountability vault 102 may communicate the unencrypted document to the requesting user 106.

Importantly, in the disclosed embodiments, the encryption key is never stored within document storage system 108 except to the extent required to execute the encryption and decryption of the stored electronic document. This allows improvements in the security of the contents of the electronic documents stored within document storage system 108. For instance, administrators or other users with high-level privileges for document storage system 108 may not be able to read the encrypted electronic documents stored in document repository 104.

Figure 2:
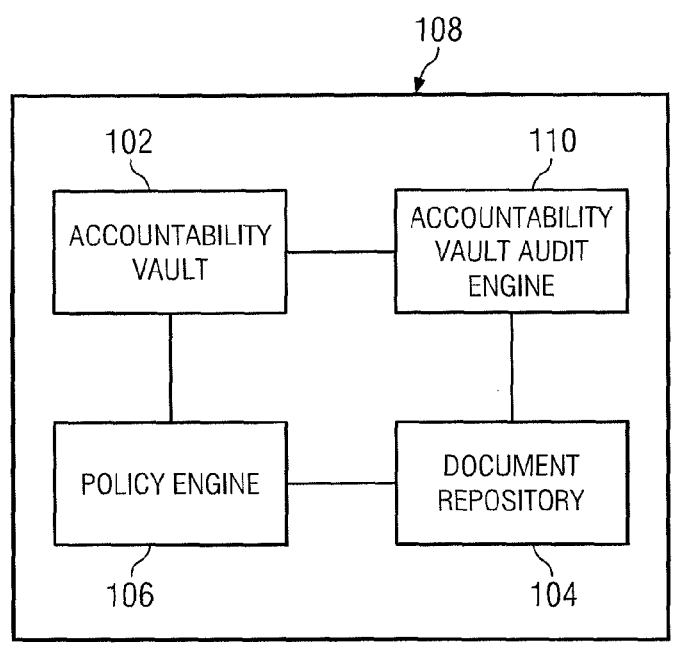
FIG. 2 is a simplified block diagram illustrating various functional components of a document storage system, in accordance with certain embodiments of the present disclosure.

FIG. 2 is a simplified block diagram illustrating various functional components of document storage system 108, in accordance with certain embodiments of the present disclosure. The illustrated document storage system 108 may include accountability vault 102, document repository 104, policy engine 106, and audit engine 110. The various components of document storage system 108 may be, in some embodiments, a software program stored on computer-readable media and executable by a processor of document storage system 108. For clarity of description, FIG. 2 depicts the components as separate modules. In some embodiments, the components may be stand-alone software programs. However, the components may also be a component or subroutine of a larger software program, or hard-coded into computer-readable media, and/or any hardware or software modules configured to perform the desired functions.

Accountability vault 102 may be configured to encrypt and decrypt an electronic document in response to communication from a user 106, as described in more detail above with reference to FIG. 1. In some embodiments, the encryption algorithm used by accountability vault 102 to create the encryption key may be any encryption algorithm configured to produce an encryption key unique to the electronic document and randomly generated. The Advanced Encryption Standard (AES) provides a well-known example of such an encryption algorithm.

In some embodiments, the encrypted documents are stored in document repository 104. Document repository 104 may be any appropriate computer-readable memory such as a database and/or database management system suitable for use in a networked document sharing system, such as Oracle Database or IBM's DB2. In some embodiments user 106 may also predefine certain policies applicable to a particular electronic document. These policies may, for instance, define a set of users 106 that may have access to the document. The addition of such a policy may help to improve security of the contents of the electronic document by denying access to a user 106 who may have received the resource locator and encryption key by mistake or against the wishes of the document's creator. The predetermined policy may also define access to a particular document in terms of certain predefined attributes of user 106, such as physical location (e.g., IP address), certain software installed on the requesting machine (e.g., rigorous antivirus software), biometric identifiers, or any other appropriate attributes of user 106.

In some embodiments, document storage system 108 may also contain audit engine 110. For some configurations of document storage system 108, it may be necessary or desirable to store electronic documents in as secure a manner as possible. To prevent unintended tampering with accountability vault 102, an administrator of document storage system 108 may wish to perform periodic audits of accountability vault 102. In some embodiments, this audit may include comparing the state of accountability vault 102 at a particular point in time (a "snapshot" of accountability vault 102) with a similar snapshot taken at a later point in time. If unacceptable discrepancies arise in the comparison, then document storage system 108 may communicate an error message indicating that tampering may have occurred. Such a communication may be intended for the creating or requesting user, or for some other user 106 such as an administrator of document storage system 108, or the communication may be logged in an electronic file or other recording mechanism.

In some embodiments, the snapshots taken of accountability vault 102 may be in the form of a hash value representative of the current state of accountability vault 102. Such a hash value or values may be obtained by any number of well-known methods. The hash value(s) may be configured to represent a particular portion of concern of accountability vault 102 (e.g., the encryption key generator) or the entirely of accountability vault 102. The hash value(s) taken at multiple points in time may then be compared to one another. In some configurations of document storage system 108, it may be most appropriate to generate a first hash value prior to runtime of document storage system 108 as a control value. During runtime, a second hash value may be generated for comparison to this control value. The second hash value may be taken at regular intervals according to the particular configuration of document storage system 108.

Figure 3:
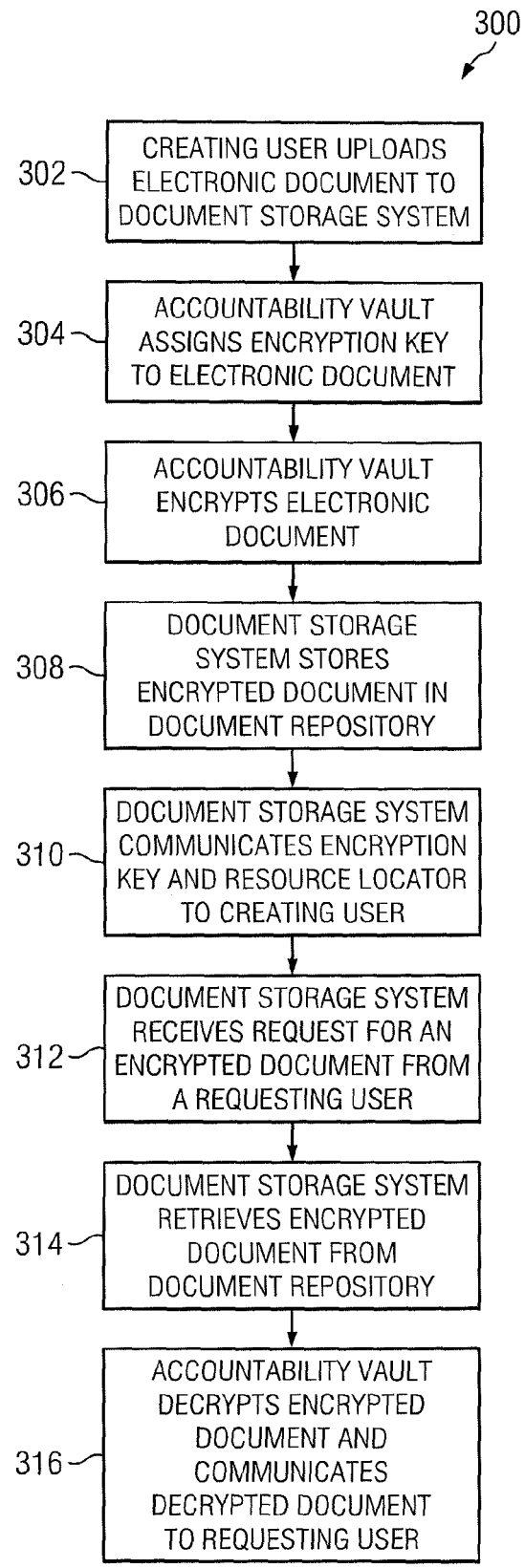
FIG. 3 illustrates a flow chart of an example method for sharing electronic documents in a networked environment, in accordance with certain embodiments of the present disclosure.

FIG. 3 illustrates a flow chart of an example method 300 for sharing electronic documents in a networked environment, in accordance with certain embodiments of the present disclosure. Method 300 includes communicating a document, encrypting that document, communicating the resource locator and encryption key, receiving the resource locator and encryption key, decrypting the document, and communicating the unencrypted document.

According to one embodiment, method 300 preferably begins at step 302. Teachings of the present disclosure may be implemented in a variety of configurations of document storage system 108. As such, the preferred initialization point for method 300 and the order of steps 302-316 comprising method 300 may depend on the implementation chosen. Additionally, the steps of method 300 may not be performed in any appropriate order other than the order illustrated.

At step 302, document creating user 106 creates an electronic document for storage in document storage system 108. Creating user 106 may, in some embodiments, create, edit, or otherwise modify an electronic document. Creating user 106 may then separately upload the electronic document to document storage system 108 or, in some embodiment, save the electronic document directly to document storage system 108. After receiving the document, accountability vault 102 of document storage system 108 may assign an encryption key to the document at step 304. After assigning the encryption key, method 300 may proceed to step 306, where accountability vault 102 may encrypt the received electronic document. After encrypting, method 300 may then proceed to step 308, where the encrypted document is stored in document repository 104 and assigned a resource locator, as described in more detail above with reference to FIGS. 1-2. Method 300 may then proceed to step 310, where the resource locator and encryption key are communicated to user 106. In some embodiments, the user 106 receiving the resource locator and encryption key from document storage system 108 may be the creating user 106 or other users 106 previously identified by creating user 106. After communicating the resource locator and encryption key, method 300 may proceed to step 312.

At step 312, method 300 may receive a request for an electronic document stored in document storage system 108 from requesting user 106. This request may include the resource locator of an electronic document and the encryption key necessary to decrypt that electronic document. After receiving this request, method 300 may proceed to step 314, where accountability vault 102 may retrieve the request document from document repository 104 and decrypt the retrieved document using the communicated encryption key. If the encryption key is not the appropriate encryption key for the retrieved document, then the decryption process will be unsuccessful. If the decryption process is successful (that is, the encryption key was appropriate for the retrieved document), then method 300 may proceed to step 316, where the decrypted document may be communicated to the requesting user 106. After communicating the decrypted document to requesting user 106, method 300 may terminate.

Although FIG. 3 discloses a particular number of steps to be taken with respect to method 300, method 300 may be executed with more or fewer steps than those depicted in FIG. 3. For instance, in some embodiments, method 300 may include the further steps of auditing accountability vault 102 in order to ensure its integrity, as described in more detail above with reference to FIG. 2. In other embodiments, method 300 may include a step or steps involving the verification of a document request against a predetermined policy associated with that document, as described in more detail above with reference to FIGS. 1-2.

In addition, although FIG. 3 discloses a certain order of steps comprising method 300, the steps comprising method 300 may be completed in any suitable order. For example, in the embodiment of method 300 shown, document storage system 108 retrieves an encrypted document from document repository 104 after receiving a request for that document from requesting user 106. In some configurations in which document storage system 108 receives a large volume of document requests, it may be more efficient to aggregate document requests and retrieve all of them at the same time, while executing other steps of the method during the transaction.

Using the methods and systems disclosed herein, certain problems associated with maintaining the security of the contents of electronic documents stored in a shared document repository and sharing those documents among various users 106 may be improved, reduced, or eliminated. For example, the methods and system disclosed herein allow for an encryption key unique to each stored document that is not stored within document storage system 108 such that administrators and other high-level users of document storage system 108 cannot access the contents of the shared electronic documents.

What is claimed is:

1. A method for securely sharing electronic documents on a document storage system, comprising:
   generating an encryption key unique to an electronic document associated with a creating user;
   encrypting the electronic document using the encryption key to create an encrypted electronic document;
   communicating the encrypted electronic document to a document repository, the document repository configured to store the encrypted electronic document;
   identifying a resource locator, the resource locator configured to uniquely identify the storage location of the encrypted electronic document;
   communicating the encryption key and the resource locator to the creating user wherein, after communicating the encryption key, no record of the encryption key is retained in the document storage system;
   receiving the encryption key and the resource locator from a requesting user;
   retrieving the encrypted electronic document from the document repository using the resource locator;
   decrypting the encrypted electronic document using the encryption key; and
   communicating the decrypted electronic document to the requesting user.

2. The method of claim 1, wherein communicating the encryption key and the resource locator to the creating user comprises communicating both the encryption key and the resource locator in a single uniform resource locator (URL).

3. The method of claim 1, wherein communicating the encryption key and the resource locator to the creating user comprises communicating in text format.

4. The method of claim 1, wherein communicating the encryption key and the resource locator to the creating user wherein, after communicating the encryption key, no record of the encryption key is retained in the document storage system comprises destroying any copies of the encryption key previously retained by the document storage system.

5. The method of claim 1, further comprising:
   receiving a predefined policy from the creating user, the predefined policy comprising one or more attributes defining whether the requesting user may access the electronic document;
   applying the predefined policy to the one or more attributes associated with the requesting user to determine whether the requesting user may access the electronic document.

6. The method of claim 1, further comprising auditing the document storage system to detect tampering.

7. The method of claim 6, wherein auditing the document storage system comprises:
   saving a first snapshot of an accountability vault of the document storage system prior to runtime;
   saving a second snapshot of the accountability vault during runtime;
   comparing the first snapshot and the second snapshot; and
   if the first snapshot and second snapshot do not match, communicating an error message.

8. The method of claim 7, wherein the first and second snapshots comprise hash values associated with the accountability vault.

9. A document storage system for securely sharing electronic documents, comprising:
   an accountability vault embodied in a non-transitory computer-readable medium and configured when executed by a hardware processor of the document storage system to:
   generate an encryption key unique to an electronic document associated with a creating user;
   encrypt the electronic document using the encryption key to create an encrypted electronic document;
   communicate the encrypted electronic document to a document repository communicatively coupled to the accountability vault, the document repository configured to store the encrypted electronic document;
   identify a resource locator, the resource locator configured to uniquely identify the storage location of the encrypted electronic document;
   communicate the encryption key and the resource locator to the creating user;
   receive the encryption key and the resource locator from a requesting user;
   retrieve the encrypted electronic document from the document repository using the resource locator;
   decrypt the encrypted electronic document using the encryption key; and
   communicate the decrypted electronic document to the requesting user.

10. The system of claim 9, wherein the accountability vault is further configured to communicate the encryption key and the resource locator to the creating user by communicating both the encryption key and the resource locator in a single uniform resource locator (URL).

11. The system of claim 9, wherein the accountability vault is further configured to communicate the encryption key and the resource locator to the creating user by communicating in text format.

12. The system of claim 9, wherein the accountability vault is further configured to destroy any copies of the encryption key retained by the document storage system.

13. The system of claim 9, wherein the document storage system further comprises:
   a policy engine embodied in the non-transitory computer-readable medium and configured when executed by the hardware processor of the document storage system to:
   receive a predefined policy from the creating user, the predefined policy comprising one or more attributes defining whether the requesting user may access the electronic document;
   apply the predefined policy to the one or more attributes associated with the requesting user to determine whether the requesting user may access the electronic document.

14. The system of claim 13, wherein the document storage system further comprises:
   an audit engine embodied in the non-transitory computer-readable medium and configured when executed by the hardware processor of the document storage system to audit the document storage system to detect tampering.

15. The system of claim 14, wherein the audit engine is further configured to:
   save a first snapshot of the accountability vault prior to runtime;
   save a second snapshot of the accountability vault during runtime;
   compare the first snapshot and the second snapshot; and if the first snapshot and second snapshot do not match, communicate an error message.

16. The system of claim 15, wherein the first and second snapshots comprise hash values associated with the accountability vault.

* * * * *